United States Patent

[11] 3,630,709

| [72] | Inventor | George W. Irwin |
| | | Holland, Ohio |
| [21] | Appl. No. | 841,248 |
| [22] | Filed | July 14, 1969 |
| [45] | Patented | Dec. 28, 1971 |
| [73] | Assignee | Owens-Illinois, Inc. |

[54] BLOWHEAD-OPERATING MECHANISM
9 Claims, 5 Drawing Figs.

[52] U.S. Cl. .................................................. 65/261,
65/301, 65/361
[51] Int. Cl. .................................................. C03b 9/40
[50] Field of Search ........................................ 65/261,
262, 263, 264, 265, 300, 301, 360, 266

[56] References Cited
UNITED STATES PATENTS

| 3,141,755 | 7/1964 | Olson ........................ | 65/360 |
| 3,383,193 | 5/1968 | Bailey ........................ | 65/261 X |
| 3,403,016 | 9/1968 | Smith ........................ | 65/261 |

Primary Examiner—Arthur D. Kellogg
Attorneys—D. T. Innis and E. J. Holler

ABSTRACT: The blowhead mechanism on a glass-forming machine wherein limited space is provided, is hydraulically operated so as to move the blowhead from a parked position by a horizontal swinging motion followed by a vertically downward motion into blow position. Retraction of the blowhead is carried out in the precise reverse order. Separate reciprocating motors, actuated simultaneously, through a dual cam and follower arrangement, control the movement of the blowhead support so as to operate the head from the blow position to the parked position and return.

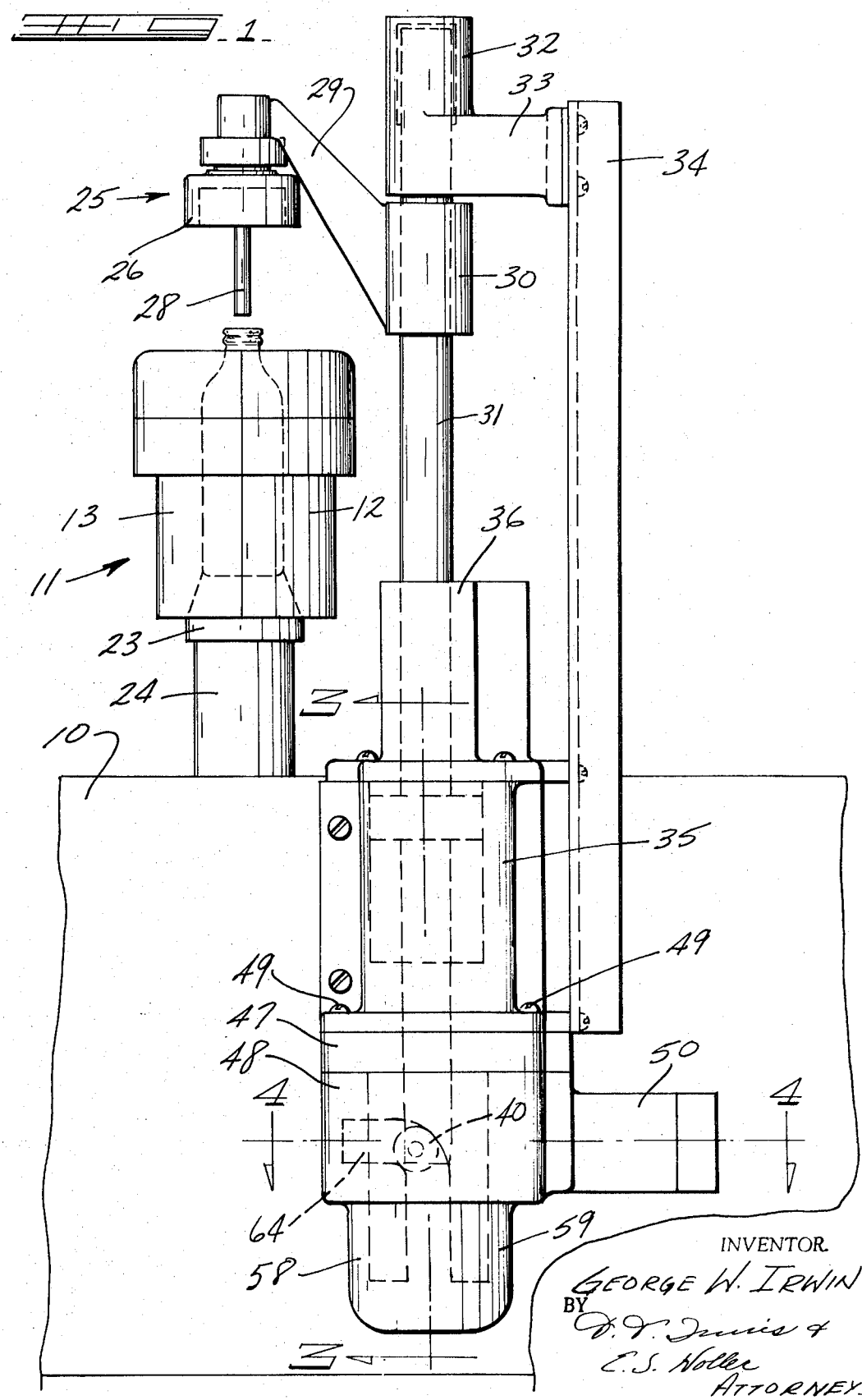

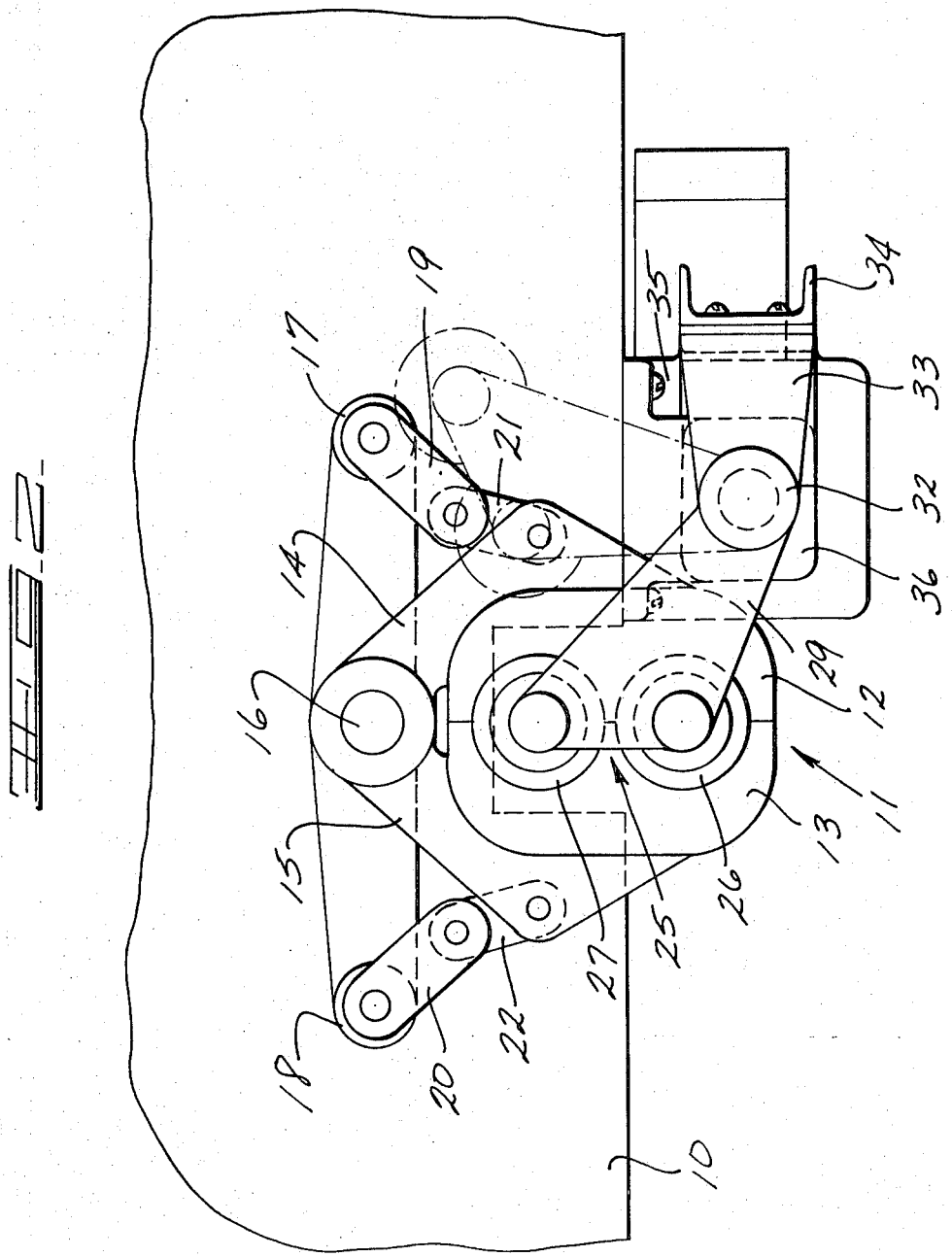

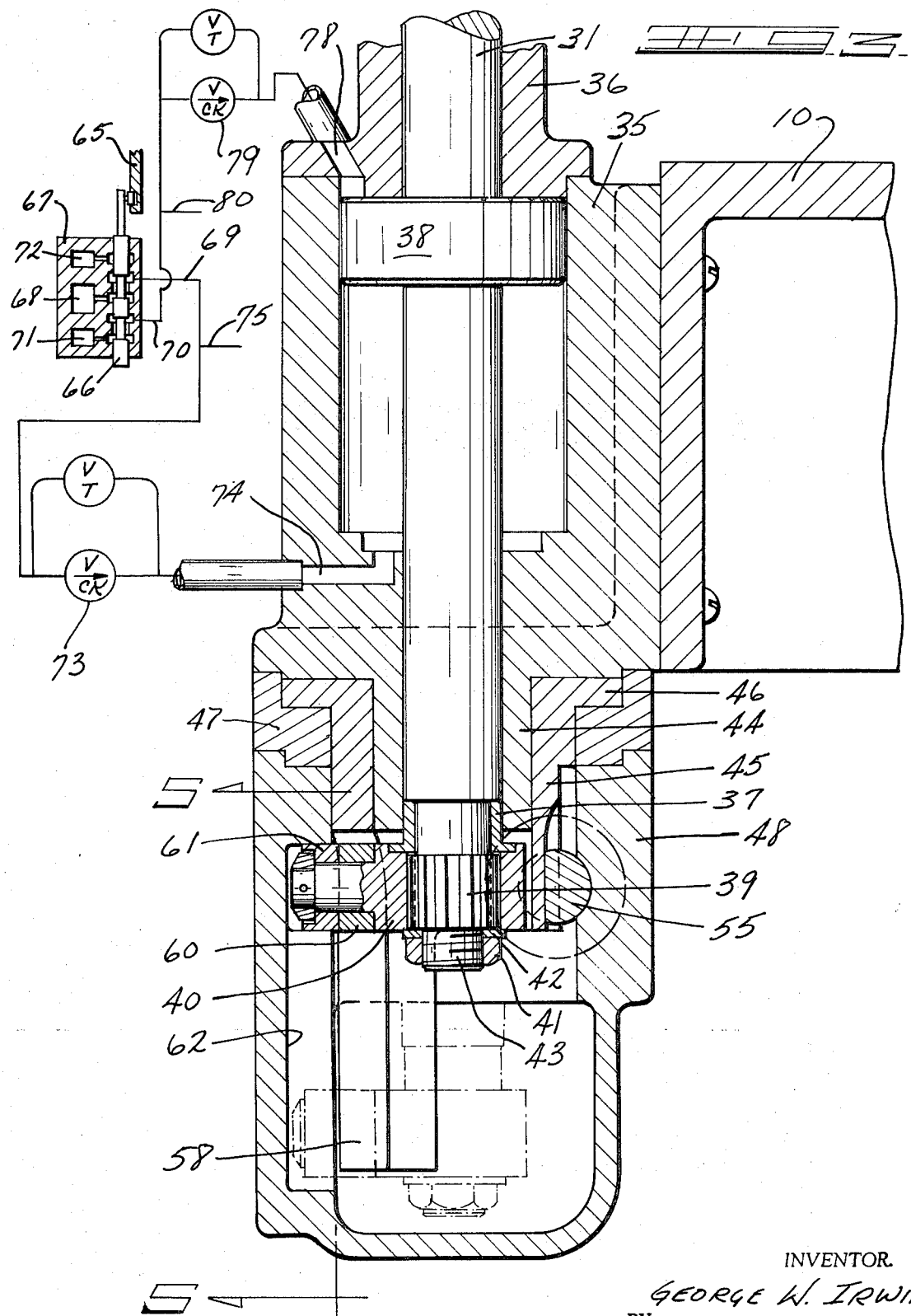

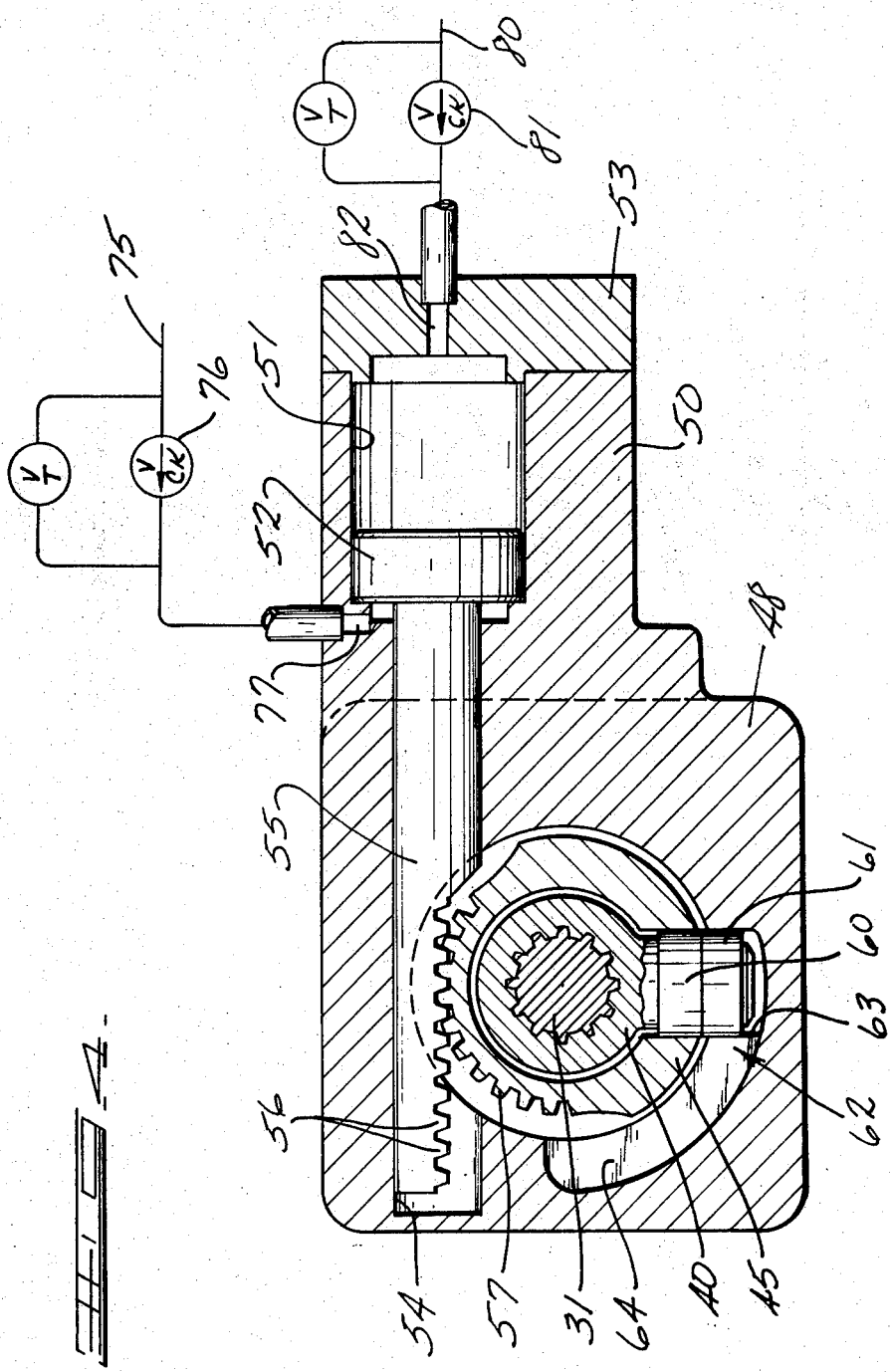

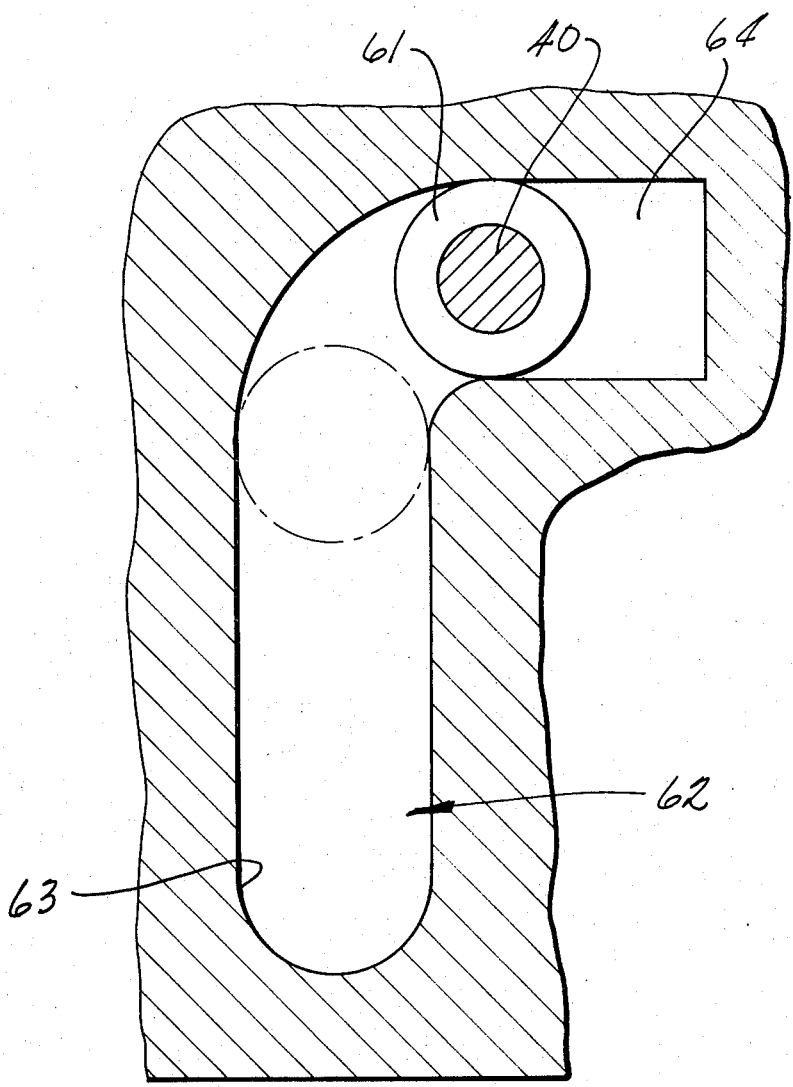

BLOWHEAD-OPERATING MECHANISM

BACKGROUND OF THE INVENTION

In the operation of glass-forming machines of the Hartford "I.S." type, wherein a parison is formed in an inverted or neck down position and then transferred by an invert arm to an upright blow mold wherein the parison is expanded into bottle form, it has become increasingly important that space requirements for operating the various adjunct mechanisms such as the blowhead or baffle mechanisms be confined to as little space as necessary.

The present invention is directed specifically to the problem of providing a mechanism for moving the blowhead into operative position in relation to the blow mold so as to expand the parison in the blow mold and then move the blowhead from the blow position to a parked position. The parked position must permit sufficient clearance so as to permit the takeout mechanism, which normally grasps the bottle by the neck after the blow mold is open, to move the bottles to a deadplate. The blowhead in its parked position must also permit access to the blow molds by the invert arm which is carrying the next set of parisons which are to be expanded in the blow mold. It has become important that the mechanism which moves the blowhead not require a great deal of overhead space since it has become more and more necessary that this space, above the blow mold, be accessible to the takeout mechanism and, in particular, the takeout mechanism as disclosed in applicant's copending application Ser. No. 730,441 filed May 20, 1968, now U.S. Pat. No. 3,559,425 jointly with Urban P. Trudeau.

DESCRIPTION OF PRIOR ART

Blowhead-operating mechanism in the past, for example as shown in U.S. Pat. No. 1,843,160 of Feb. 2, 1932 to H. W. Ingle, required extensive mechanism extending well above the plane of the molds. The holder and motor for lifting the blowhead and the cam means for guiding the blowhead out of vertical alignment with the blow mold were located above the plane of the mold and it will be noted that the cam path is of a type such that the vertical movement of the blowhead must be continued beyond that necessary to clear the bottle in order to provide the full swinging motion. This arrangement required fairly large space requirements above the blow molds, which space is not readily available if the molding equipment is to be most effectively limited in its utilization of space beneath the forehearth or glass melting and feeding equipment.

The present mechanism is compact and functions with greater precision than could be effected by the prior art mechanism.

SUMMARY

This invention relates to blowhead-operating mechanism in which a vertical shaft carries a blowhead supporting arm which extends outwardly therefrom. A pair of motors are connected to the shaft with one of the motors providing the raising and lowering motion necessary to the blowhead mechanism and the other motor providing the motion required to swing the blowhead in alignment with the blow mold or to a remote or parked position. A cam-follower mechanism is carried by the shaft and is guided in a cam having horizontal and vertical components. The cam arrangement and follower mechanism provide a compact space-saving arrangement for controlling the necessary blowhead movements on a glass-forming machine.

BRIEF DESCRIPTION OF THE DRAWINGS

FIG. 1 is a side-elevational view of the blowhead mechanism of the invention;

FIG. 2 is a top plan view of the apparatus of FIG. 1;

FIG. 3 is a cross-sectional view taken at line 3—3 of FIG. 1 on an enlarged scale;

FIG. 4 is a cross-sectional view taken at line 4—4 of FIG. 1 on an enlarged scale; and FIG. 5 is a cross-sectional view of FIG. 3 taken at line 5—5.

The following detailed description of the apparatus of the invention will necessarily be limited to the blowhead mechanism and it should be kept in mind that this apparatus is operated in conjunction with the normal glass-forming cycle of the conventional I.S. machine. Only the blow mold station is shown in any detail.

Mechanism, not shown, operates a pair of rotatable shafts 17 and 18 which extend upwardly from the base 10. The shafts 17 and 18, at their upper ends, carry crank arms 19 and 20 which in turn are pivotally connected by links 21 and 22 to the mold arms 14 and 15. Thus it can be seen that upon rotation of the shafts 17 and 18, so as to rotate the arms 19 and 20 toward each other, the mold halves 12 and 13 will be opened.

It should also be kept in mind that each mold cavity is provided with a bottom plate 23 which is supported by a post 24 carried by the base 10. This bottom plate serves to support the ware or bottle, after it has been fully blown, during the opening of the molds and positions the bottle such that a pair of tongs of the takeout mechanism may be moved into grasping relationship with respect to the finish or neck of the bottle to remove the bottles from the blow molding position and carry them to a wind box or cooling position.

The bottles are expanded in the blow mold 11 by the introduction of air under pressure to the interior of the glass parison by a blowhead mechanism 25. The blowhead mechanism 25, as shown, consists of downwardly open bell-like members 26 and 27 and a downwardly extending blow tube 28. Both blowhead members 26 and 27 are supported by an arm 29, with the arm 29 being formed integral with a sleeve 30 which is mounted on and fixed to a vertical operating shaft 31.

The operating shaft 31 has its upper end confined to a vertical reciprocating travel by a bearing and end cap 32. The end cap 32 is provided with a downwardly opening vertical recess formed therein in which the upper end of the shaft 31 is adapted to slide. The cap 32 is supported by a radially extending arm 33 which in turn is bolted to a vertical support beam 34. The beam 34 is fixed to the side of a motor housing 35. The motor housing 35 in turn is fixed to the side of the base 10 of the forming machine. The shaft 31, at its lower end, extends through a vertical bushing and motor end sealing member 36. As can readily be seen when viewing FIGS. 1 and 3, the shaft 31 extends completely through the motor housing 35 and is guided thereby. Adjacent its lower end the shaft 31 has a reduced diameter over which a split spacer 37, which is of the same exterior dimension as the major portion of the shaft 31, is positioned.

A piston 38 is fixed to the shaft 31 on that portion of the shaft which is within the motor housing 35, it being understood that the introduction of fluid under pressure either below or above the piston 38 will cause vertical reciprocation of the shaft 31. The lower end of the shaft 31 is provided with a splined area 39 to which a cam-follower casting 40, having internally formed complementary splines, is fixed and held axially with respect to the shaft 31 by a nut 41 and washer 42 retained on threaded lower end 43 of the shaft 31.

The motor housing 35 has a downwardly extending, annular portion 44 of reduced diameter about which an annular sleevelike cam member 45 is positioned. As can be readily seen from FIG. 3, the rotatable cam member 45 has an outwardly extending upper flange portion 46. This flange portion 46 is held in sliding engagement with the lower end of the motor housing 35 by a spacer member 47. The spacer member 47 and a lower, cam housing 48 are fixed to the lower portion of the motor housing 35 by screws 49, as shown in FIG. 1.

The housing 48 is formed with an outwardly extending portion 50 with a horizontally formed cylinder passage 51 formed therein within which a piston 52 is adapted to reciprocate. The outer face of the housing portion 50 is closed by a cylinder head 53 and a horizontal passage 54 extending from the opposite side of the cylinder 51 serves to guide a piston rod rack 55, it being understood that the rack 55 is fixed to the piston 52 and is actuated thereby. The end of the rack 55, remote from the piston 52, is provided with a plurality of vertical gear teeth 56 which form a rack engaged with vertical gear teeth 57 extending about approximately one-half the circumference of the cam member or cam sleeve 45.

The cam member 45 has a pair of spaced, downwardly extending cam-defining arms 58 and 59. The vertical gap formed between the arms 58 and 59 is spanned by a portion of the cam-follower member 40. As best shown in FIGS. 3 and 4, the cam-follower member 40 is provided with two independently rotatable sleeves 60 and 61. The sleeve 60, which in a sense functions as a roller, is vertically moveable between the members 58 and 59. The outer sleeve or roller 60 extends into a compound cam slot 62 formed in the interior surface of the lower housing 48. This cam slot 62, as best shown in FIGS. 4 and 5, has a vertical portion or section 63 and a horizontal portion or section 64.

With the particular cam slot 62, as shown in FIG. 5, it can be seen that the motion of the lower end of the shaft and, in particular the cam-follower member 40, is limited to vertical motion until the shaft 31 and its cam follower 40 has been raised sufficiently to permit the roller or sleeve 61 to come into alignment with the horizontal portion 64 of the cam slot 62.

Movement of the shaft 31 in a vertical direction is controlled by the operation of the motor 35 and the movement of its piston 38. Rotational movement of the shaft 31 is controlled by the shape of the cam 62 and by the operation of the piston 52 through the cam sleeve or member 45.

With particular reference to FIGS. 3 and 4, the timing of the operation of these two motors will be explained. A main cam plate 65 of the forming machine drive will effectively, axially reciprocate a valve spool 66 within a valve block 67. Chamber 68 of the valve block 67 is provided with fluid under pressure which will alternately be connected to the lines 69 and 70. The other two chambers 71 and 72 within the valve block 67 are exhaust chambers. With the spool 66 in the position shown in FIG. 3, fluid under pressure from the chamber 68 is fed to the line 69 passing through the check valve 73 to a passage 74 opening into the lower end of the motor 35.

A branch line 75 is also fed with fluid under pressure which passes through a check valve 76 which in turn is connected to a passage 77 opening into the cylinder 51 in back of piston 52. As particularly shown in FIG. 4, the piston 52 has not been shifted; however, fluid pressure has been applied to the cylinder 51 through the passage 77 at the same time as fluid pressure was introduced beneath the piston 38. So, as depicted in FIG. 4, the shaft 31 has lifted to substantially its full height, with the blowhead 25 being poised in alignment with the necks of the bottles, yet sufficiently clear of the finish so that movement from the blow position to the parked position may take place. It is this point in time which is specifically illustrated in FIGS. 3 and 4. As the cam follower 40 and its roller or sleeve 61 arrive at the top of the vertical portion of the cam path 62, the fluid under pressure being fed through passage 77 and biasing the piston 52 toward the right, as viewed in FIG. 4, the rotatable sleeve or roller 61 will move into the horizontal portion 64 of the cam slot 62 and be moved in this direction by the cam member 45 driven by the rack 55. Actually, as viewed in FIG. 5, the cam-follower roller 61 does not make a precise 90° movement, but is smoothly permitted to move vertically and then change into a horizontal movement by the fact that it is rollingly guided around a curvature at the upper end of the cam slot 62. Upon shifting of the spool 66 in an upward direction, as viewed in FIG. 3, the fluid under pressure in chamber 68 will be fed to the line 70 which is connected to a passage 78 through a check valve 79 to the upper end of the motor 35 and a branch passage 80 through a check valve 81 to a passage 82 communicating with the cylinder head 53, thus causing both the piston 38 to be biased downwardly and the piston 52 to be biased toward the left, as viewed in FIG. 4.

Obviously, if the pistons 38 and 52 are moved in one direction, they must displace the fluid which is, in effect, in front of the piston and the rate of outflow of the fluid will determine the speed with which the two pistons will move in either of its two directions. Speed control is important and with this in view, a throttle valve is provided across each check valve provided in the lines 69, 70, 75 and 80. Thus it can readily be seen that settings of the throttle valve will determine the rate of movement of the pistons in the two directions and aids in the timing of the motions necessary to move the blowhead mechanisms to its parked position or to its blow position.

I claim:

1. Blowhead-operating mechanism comprising, a vertical shaft, a blowhead arm connected to said shaft and extending outwardly therefrom, a blowhead carried by the extending end of said blowhead arm, a first motor means connected to said shaft for vertically reciprocating same, a second motor, a lower housing enclosing the lower end of said shaft, a rotatable sleeve mounted in said housing concentric with said shaft, means connecting said second motor to rotate said sleeve, a radially extending cam-follower roller fixed to said shaft and extending through a vertical slot defined by two longitudinally downwardly depending cam arms attached to said rotatable sleeve, and into a vertical cam slot formed in said lower housing, said cam slot having a horizontal section connected with said vertical cam slot at the upper end thereof, and means to rotate said sleeve when the cam roller on said shaft reaches said horizontal section.

2. The apparatus of claim 1, further including a source of fluid under pressure and means connecting said source to said motors simultaneously and connecting the opposite sides of said motors to exhaust.

3. The apparatus of claim 2, further including means in the exhausting means for controlling the rate of movement of said motors.

4. Blowhead-operating mechanism comprising, a vertical shaft, a blowhead arm connected to said shaft and extending outwardly therefrom, a blowhead carried by the extending end of said arm, a housing enclosing the lower end of said shaft, a first motor means connected to said shaft for vertically reciprocating same, a second motor mounted on said housing, a rotatable sleeve mounted in said housing concentric with said shaft, means connecting said second motor to rotate said sleeve, a radially extending cam-follower roller fixed to said shaft and extending through a vertical slot defined by two longitudinally downwardly depending cam arms attached to said rotatable sleeve, and into a second vertical cam slot formed in said lower housing, said second cam slot having a horizontal section connected with said vertical section at the upper end thereof, and means to rotate said sleeve when the cam roller on said shaft reaches the horizontal section of said second slot.

5. The apparatus of claim 4, further including a source of fluid under pressure and means connecting said source to said motors simultaneously and connecting the opposite sides of said motors to exhaust means.

6. The apparatus of claim 5, further including means in the exhausting means for controlling the rate of movement of said motors.

7. Blowhead-operating mechanism comprising, a vertical shaft, a blowhead arm connected to said shaft and extending outwardly therefrom, a blowhead mounted on the extending end of said arm, means connected to said shaft for vertically reciprocating said shaft, a lower housing enclosing the lower end of said shaft, a reciprocating motor mounted on said housing, a sleeve mounted for rotation in said housing about the axis of said shaft, means connecting said motor to said sleeve for oscillating said sleeve, a radially extending cam follower fixed to the lower end of said shaft and extending outwardly through a vertical slot defined by two longitudinally downwardly depending cam arms attached to said rotatable sleeve, a cam slot formed in said lower housing, said cam slot having a vertical section and a horizontal section connected with said vertical section at the upper end thereof, said cam follower being positioned in said cam slot, and means to rotate said sleeve when the cam follower on said shaft reaches the horizontal section of said cam slot for moving the blowhead from blowing position to "parked" position and from "parked" position to alignment with the blowing position.

8. Blowhead-operating mechanism comprising, a vertical shaft, a blowhead arm connected to said shaft and extending outwardly therefrom, a blowhead mounted on the extending end of said arm, a cylinder surrounding the lower portion of said shaft with said shaft extending through the cylinder, a piston means in said cylinder and connected to said shaft for vertically reciprocating said shaft, a housing mounted beneath said cylinder and enclosing the lower end of said shaft, a reciprocating motor mounted on said housing, a sleeve mounted for rotation in said housing about said shaft, means connecting said motor to rotate said sleeve, a radially extending cam-follower roller fixed to the lower end of said shaft and extending outwardly through a vertical slot defined by two longitudinally downwardly depending cam arms attached to said rotatable sleeve, a cam slot formed in said lower housing, said cam slot having a vertical section and a horizontal section connected with said vertical section at the upper end thereof, said cam-follower roller being positioned in said cam slot, and means to rotate said sleeve when the cam roller on said shaft reaches the horizontal section of said cam slot for moving the blowhead from blowing position to "parked" position.

9. Blowhead-operating mechanism comprising, a vertical shaft, a blowhead arm connected to said shaft and extending outwardly therefrom, a blowhead mounted on the extending end of said arm, means connected to said shaft for vertically reciprocating said shaft, a housing mounted beneath said reciprocating means and enclosing the lower end of said shaft, a reciprocating motor mounted on said housing, a sleeve mounted for rotation in said housing about said shaft, means connecting said motor to rotate said sleeve, a radially extending, roller supporting casting fixed to the lower end of said shaft, a pair of rollers mounted coaxially on said casting, the first one of said rollers extending outwardly through a vertically elongated slot defined by two longitudinally downwardly depending cam arms attached to said rotatable sleeve, a cam slot formed in said lower housing, said cam slot having a vertical section and a horizontal section connected with said vertical section at the upper end thereof, the other of said rollers being positioned in said cam slot, and means to rotate said sleeve when said other roller reaches the horizontal section of said cam slot thereby moving the blowhead from blowing position to "parked" position.

* * * * *